United States Patent
Kawakita et al.

(10) Patent No.: US 9,317,219 B2
(45) Date of Patent: Apr. 19, 2016

(54) SEMICONDUCTOR DEVICE AND PROCESSOR SYSTEM INCLUDING THE SAME

(71) Applicant: Renesas Electronics Corporation, Tokyo (JP)

(72) Inventors: Daisuke Kawakita, Tokyo (JP); Toshikazu Hori, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 72 days.

(21) Appl. No.: 14/228,238

(22) Filed: Mar. 27, 2014

(65) Prior Publication Data

US 2014/0310452 A1  Oct. 16, 2014

(30) Foreign Application Priority Data

Apr. 16, 2013 (JP) ................................. 2013-085579

(51) Int. Cl.
*G06F 3/06* (2006.01)
*G06F 13/36* (2006.01)

(52) U.S. Cl.
CPC ............ *G06F 3/0658* (2013.01); *G06F 3/0625* (2013.01); *G06F 3/0673* (2013.01); *G06F 13/36* (2013.01); *Y02B 60/1228* (2013.01)

(58) Field of Classification Search
USPC ........... 711/154, 105, 152, 163; 713/300, 310
See application file for complete search history.

(56) References Cited

U.S. PATENT DOCUMENTS

| 5,361,392 | A | * | 11/1994 | Fourcroy | ............... G06F 1/3203 713/310 |
|---|---|---|---|---|---|
| 5,828,568 | A | * | 10/1998 | Sunakawa | ............. G06F 1/3203 700/79 |
| 6,662,278 | B1 | | 12/2003 | Kahn et al. | |
| 7,213,160 | B2 | * | 5/2007 | Obara | .................... G06F 1/3209 713/310 |
| 8,638,460 | B2 | * | 1/2014 | Shima | ................. G06F 13/4282 358/1.13 |
| 2007/0245073 | A1 | | 10/2007 | Matsutani | |
| 2009/0016137 | A1 | | 1/2009 | Hur et al. | |
| 2009/0063791 | A1 | | 3/2009 | Cho | |
| 2010/0287391 | A1 | | 11/2010 | Ochiai | |

(Continued)

FOREIGN PATENT DOCUMENTS

| EP | 1 360 590 B1 | 11/2003 |
|---|---|---|
| JP | 2004-120781 A | 4/2004 |
| JP | 2007-094649 A | 4/2007 |

(Continued)

OTHER PUBLICATIONS

European Search Report dated Nov. 27, 2014 for European Application No. 14161 427.1.

*Primary Examiner* — Pierre-Michel Bataille
(74) *Attorney, Agent, or Firm* — Shapiro, Gabro and Rosenberger, PLLC (57) ABSTRACT

Provided is a semiconductor device including: a plurality of processing circuits; an arbitration circuit that arbitrates a plurality of data transfer requests issued by the plurality of processing circuits; a mask control circuit that loads the plurality of data transfer requests arbitrated by the arbitration circuit, and sequentially outputs the plurality of data transfer requests after a lapse of a mask period; and a memory controller that accesses a memory based on the plurality of data transfer requests sequentially output from the mask control circuit, and switches a mode of the memory to a power saving mode when no data transfer request is output from the mask control circuit for a predetermined period.

13 Claims, 9 Drawing Sheets

(56) References Cited

U.S. PATENT DOCUMENTS

2011/0258354 A1 10/2011 Wang
2012/0064952 A1* 3/2012 Iijima ............... H03K 17/6221
　　　　　　　　　　　　　　　　　　　　455/571

FOREIGN PATENT DOCUMENTS

JP　　2007-257774 A　　10/2007
JP　　2012-133638 A　　7/2012

* cited by examiner

SEMICONDUCTOR DEVICE AND PROCESSOR SYSTEM INCLUDING THE SAME

CROSS-REFERENCE TO RELATED APPLICATIONS

This application is based upon and claims the benefit of priority from Japanese patent application No. 2013-085579, filed on Apr. 16, 2013, the disclosure of which is incorporated herein in its entirety by reference.

BACKGROUND

The present invention relates to a semiconductor device and a processor system including the semiconductor device. More particularly, the present invention relates to a semiconductor device suitable for suppressing an increase in power consumption, and a processor system including the semiconductor device.

In the fields of a baseband processor and an application processor for cellular phones, the respective requirements regarding the function and performance thereof have become exacting. To satisfy such requirements, the capacity of a memory, such as a DRAM, has been increased, or the operating frequency of a processor has been increased, which results in a problem of an increase in power consumption.

For example, Japanese Unexamined Patent Application Publication No. 2012-133638 discloses an electronic device including a DRAM and a memory controller that controls the DRAM.

Additionally, Japanese Unexamined Patent Application Publication No. 2004-120781 discloses a memory circuit that outputs a control signal WAIT to a control circuit during a read transfer or a write transfer, thereby limiting access from the control circuit.

Japanese Unexamined Patent Application Publication No. 2007-257774 discloses a memory control device including adjustment means that adjusts a timing for refreshing a DRAM according to the degree of congestion of a bus used for a data transfer with the DRAM.

Japanese Unexamined Patent Application Publication No. 2007-94649 discloses an access arbitration circuit that dynamically changes the order of priority of previously stored access requests based on the order of priority of newly stored access requests.

SUMMARY

The present inventors have found various problems in the process of developing a semiconductor device and a processor system including the semiconductor device. Each embodiment disclosed herein provides a semiconductor device suitable for a radio communication terminal, such as a cellular phone, and a processor system including the semiconductor device. Further detailed features will be apparent from the following description and the accompanying drawings.

According to one aspect of the present invention, a mask control circuit is provided that loads a plurality of data transfer requests arbitrated by an arbitration circuit, and sequentially outputs the plurality of data transfer requests after a lapse of a mask period.

According to one aspect of the present invention, it is possible to provide a high-quality semiconductor device and a processor system including the semiconductor device.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Preliminary Review by the Present Inventors

Details of the preliminary review by the present inventors will be described prior to the description of embodiments.

Figure 8:
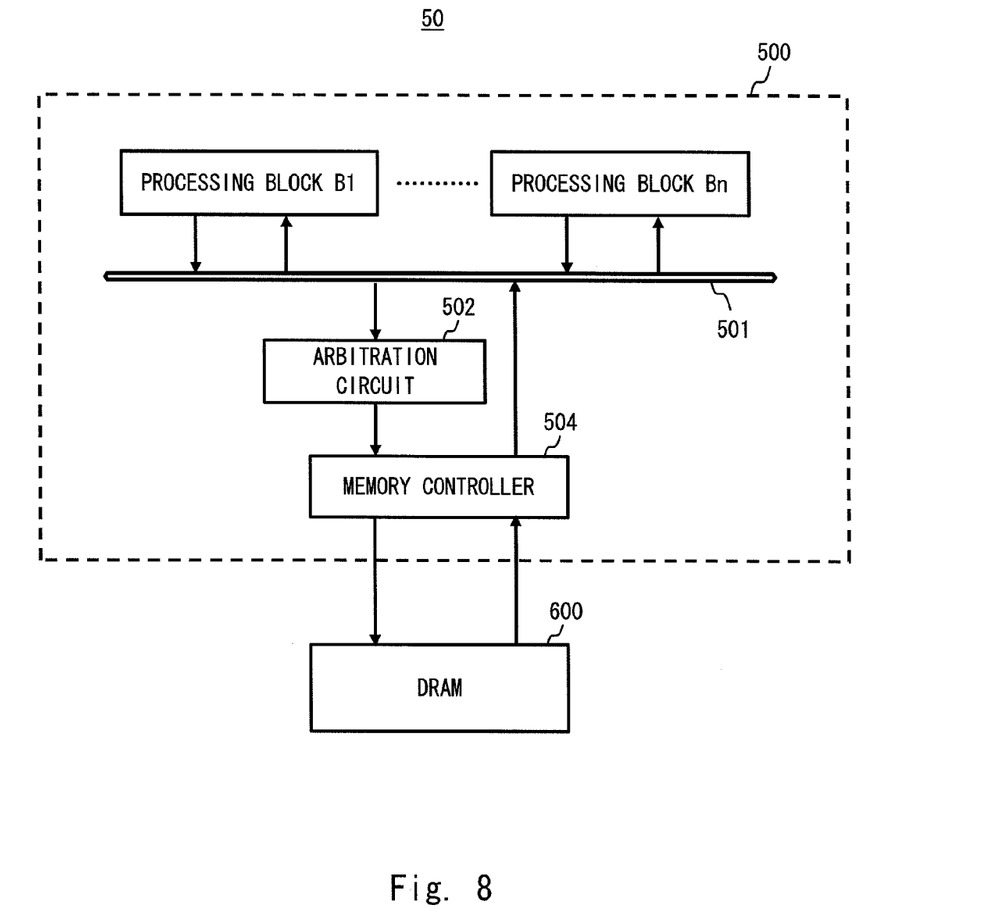
FIG. 8 is a block diagram showing a configuration example of a processor system reviewed by the present inventors.

FIG. 8 is a block diagram showing a configuration example of a processor system 50 according to an idea conceived of before an embodiment of the invention was accomplished. The processor system 50 shown in FIG. 8 includes a semiconductor device 500 and a DRAM 600.

The semiconductor device 500 includes at least n (n is an integer equal to or greater than 2) processing blocks B1 to Bn, a bus 501, an arbitration circuit 502, and a memory controller 504.

The processing blocks B1 to Bn are, for example, arithmetic processing circuits such as CPUs, or data processing circuits such as graphics engines. The processing blocks B1 to Bn issue data transfer requests RQ1 to RQn, respectively, to the DRAM 600 at a given timing. The data transfer requests RQ1 to RQn are supplied to the memory controller 504 via the bus 501 and the arbitration circuit 502. In this case, the arbitration circuit 502 determines the order of priority of a plurality of data transfer requests in accordance with a predetermined rule (for example, when a plurality of data transfer requests are simultaneously issued), and sequentially outputs the data transfer requests one by one to the memory controller 504.

The memory controller 504 accesses the DRAM 600 based on the data transfer requests sequentially output from the arbitration circuit 502. For example, the memory controller 504 reads out data stored in a memory cell at a designated address in the DRAM 600 based on the data transfer request, or writes data into a memory cell at a designated address in the DRAM 600, based on the data transfer requests. The memory controller 504 outputs data read from the DRAM 600, or information on data write completion notification indicating completion of data write to the DRAM 600, to the processing blocks which have issued the data transfer requests, via the bus 501.

When a subsequent data transfer request is not present (not received) for a predetermined period after completion of access to the DRAM 600 based on a certain data transfer request, the memory controller 504 causes the mode of the DRAM 600 to be switched from a normal operation mode to a power saving mode, and maintains the power saving mode until the subsequent data transfer request is received.

The term "power saving mode" of the DRAM 600 refers to a so-called self-refresh mode. In the self-refresh mode, the DRAM 600 repeatedly executes a refresh operation autonomously by a timer which is incorporated therein or connected thereto. At this time, the DRAM 600 is only supplied with power, while it is not supplied with any clock signal. This results in a reduction in power consumption of the DRAM 600.

Figure 9:
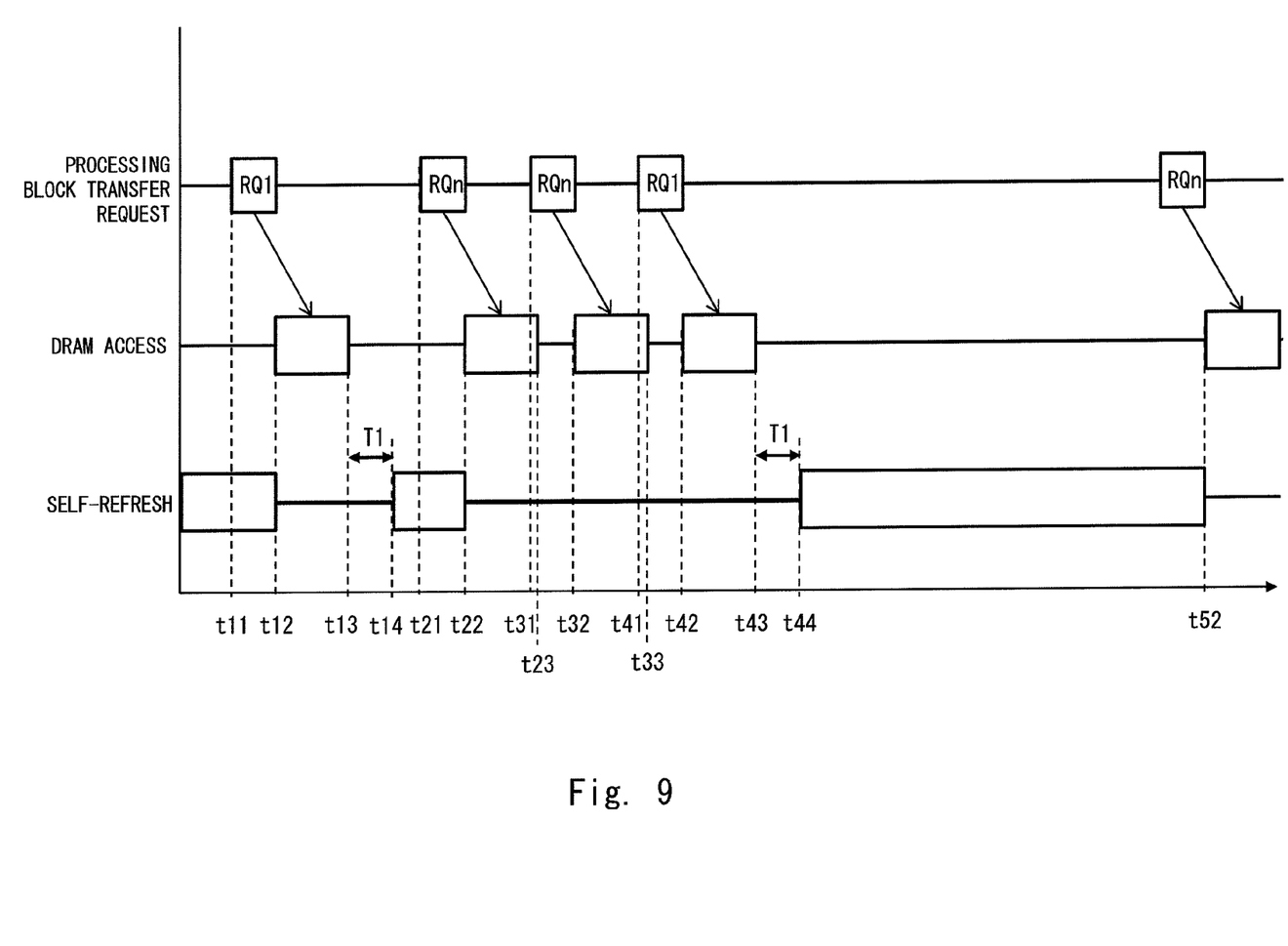
FIG. 9 is a timing diagram showing an operation of the processor system reviewed by the present inventors.

Referring next to FIG. 9, an operation of the processor system 50 shown in FIG. 8 will be described. FIG. 9 is a timing diagram showing an operation of the processor system 50.

First, the processing block B1 issues the first data transfer request RQ1 (time t11). Upon receiving the data transfer request RQ1, the memory controller 504 accesses the DRAM 600 based on the data transfer request RQ1 (from time t12 to time t13). Since the memory controller 504 receives no subsequent data transfer request for a predetermined period T1 after the completion of the access to the DRAM 600, the memory controller 504 causes the mode of the DRAM 600 to be switched from the normal operation mode to the power saving mode (time t14).

Next, the processing block Bn issues the first data transfer request RQn (time t21). Upon receiving the data transfer request RQn, the memory controller 504 accesses the DRAM 600 based on the data transfer request RQn (from time t22 to time t23). Upon receiving the data transfer request RQn, the memory controller 504 causes the mode of the DRAM 600 to be switched from the power saving mode to the normal operation mode (time t22). Since the memory controller 504 receives the subsequent data transfer request during the period from the completion of the access to the DRAM 600 to the lapse of the predetermined period T1, the memory controller 504 maintains the normal operation mode of the DRAM 600 without causing the mode to be switched to the power saving mode.

Next, the processing block Bn issues the second data transfer request RQn (time t31). Upon receiving the data transfer request RQn, the memory controller 504 accesses the DRAM 600 based on the data transfer request RQn (from time t32 to time t33). Since the memory controller 504 receives the subsequent data transfer request during the period from the completion of the access to the DRAM 600 to the lapse of the predetermined period T1, the memory controller 504 maintains the normal operation mode of the DRAM 600 without causing the mode to be switched to the power saving mode.

Next, the processing block B1 issues the second data transfer request RQ1 (time t41). Upon receiving the data transfer request RQ1, the memory controller 504 accesses the DRAM 600 based on the data transfer request RQ1 (from time t42 to time t43). Since the memory controller 504 receives no subsequent data transfer request during the period from the completion of the access to the DRAM 600 to the lapse of the predetermined period T1, the memory controller 504 causes the mode of the DRAM 600 to be switched from the normal operation mode to the power saving mode (time t44). Then the memory controller 504 maintains the power saving mode until the subsequent data transfer request is received (RQn) (from time t44 to time t52).

In the processor system 50 shown in FIG. 8, the period in which the mode of DRAM 600 is set to the power saving mode is shortened depending on the interval or frequency of access to the DRAM 600. For example, when the subsequent data transfer request is received after the completion of the access to the DRAM 600 and immediately before the lapse of the predetermined period T1, the mode of the DRAM 600 is maintained as the normal operation mode. When the access to the DRAM 600 is repeated at such intervals, the period in which the mode of the DRAM 600 is set to the power saving mode is shortened. Thus, the processor system 50 shown in FIG. 8 has a problem that it is difficult to sufficiently suppress an increase in power consumption.

Hereinafter, embodiments will be described with reference to the drawings. The drawings are made in a simplified manner, and therefore the technical scope of embodiments should not be narrowly interpreted based on the drawings. The same components are denoted by the same reference numerals, so repeated description thereof is omitted.

In the following embodiments, explanations are made by referring to several sections or several embodiments for convenience, as required, but they are mutually related, and are in such a relation to each other that one of them is a modified example, an application example, a detailed explanation, a supplemental explanation, or the like of a part or all of the other, unless otherwise specified. Further, in the following embodiments, when a number of an element (including number, numerical value, quantity, range etc.) or the like is mentioned, the number is not limited to that specific number, and may be larger or smaller than the mentioned number, except for the case where it is explicitly indicated that the number should be the specifically-mentioned number, or it is theoretically clear that the number should be limited to the specifically-mentioned number.

Further, in the following embodiments, the constituent elements thereof (including operation steps etc.) are not necessarily indispensable, except for the case where it is explicitly indicated that a specific element is indispensable, or it is theoretically clear that a specific element is indispensable. Similarly, in the following embodiments, when shapes, positional relationship etc. of the constituent elements are mentioned, they include substantially similar or analogous shapes and so forth, except for the case where it is explicitly indicated, or it is theoretically clear that the above is not true. This also applies to the above-mentioned values (including number, numerical value, quantity, range, etc.) and the like.

First Embodiment

Figure 1:
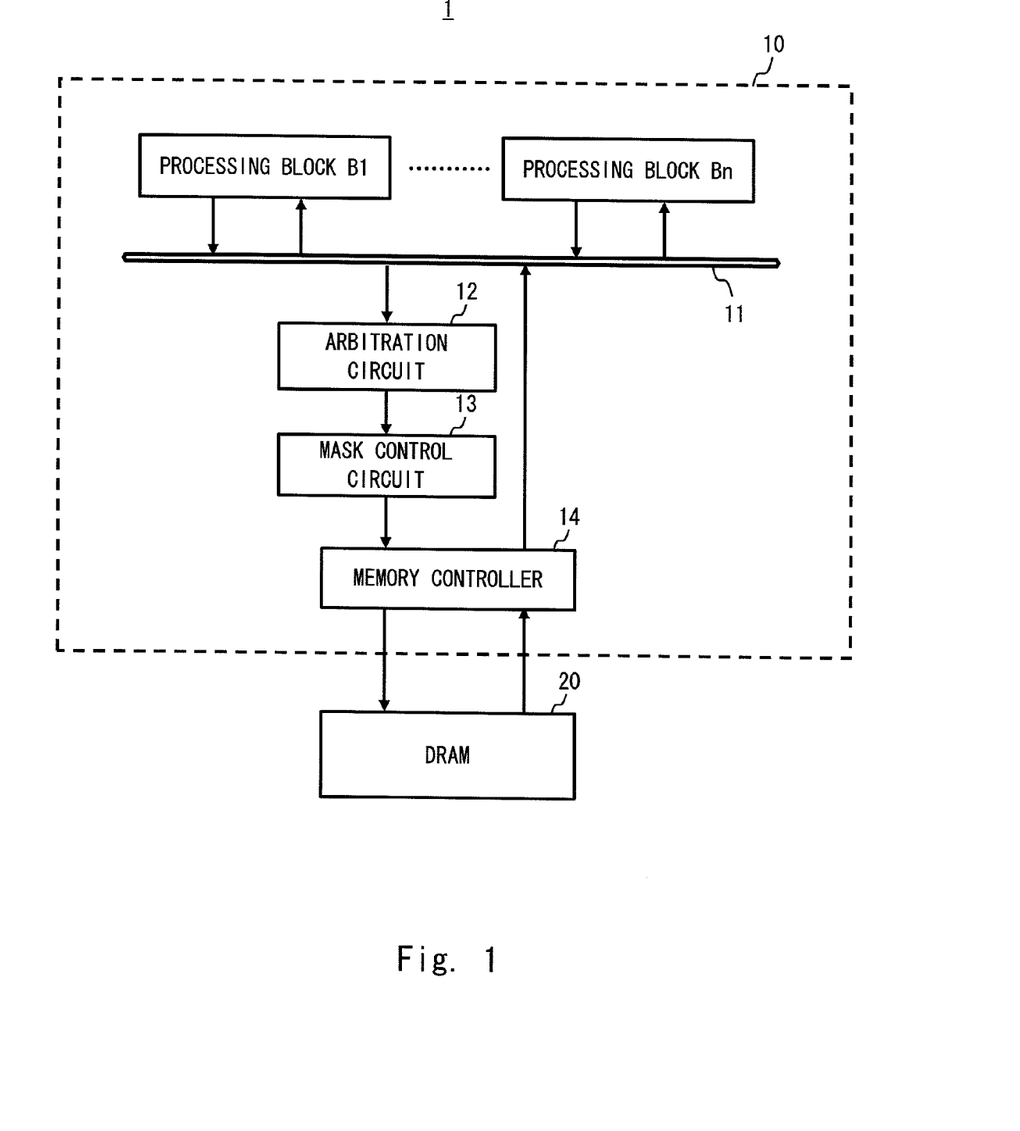
FIG. 1 is a block diagram showing a configuration example of a processor system according to a first embodiment.

FIG. 1 is a block diagram showing a configuration example of a processor system according to a first embodiment. The processor system according to the first embodiment (and a semiconductor device provided therein) includes a mask control circuit that sequentially outputs a plurality of data transfer requests, which are output from an arbitration circuit, to a memory controller after a lapse of a mask period. This allows the processor system according to the first embodiment (and the semiconductor device provided therein) to effectively set a mode of a memory to a power saving mode, thereby suppressing an increase in power consumption. This processor system (and the semiconductor device provided therein) is applied to, for example, a radio communication terminal such as a cellular phone. The processor system will be described in detail below.

A processor system 1 shown in FIG. 1 includes a semiconductor device 10 and a DRAM 20. Note that a memory such as an SRAM or an FRAM (Registered Trademark) may be used instead of the DRAM 20. The semiconductor device 10 is a semiconductor chip, and includes at least n (n is an integer equal to or greater than 2) processing blocks (processing circuits) B1 to Bn, a bus 11, an arbitration circuit 12, a mask control circuit 13, and a memory controller 14.

The processing blocks B1 to Bn are, for example, arithmetic processing circuits such as CPUs, or data processing circuits such as graphics engines. The processing blocks B1 to Bn issue data transfer requests RQ1 to RQn, respectively, to the DRAM 20 at a given timing. These data transfer requests RQ1 to RQn are supplied to the mask control circuit 13 via the bus 11 and the arbitration circuit 12. In this case, the arbitration circuit 12 determines the order of priority of a plurality of data transfer requests in accordance with a predetermined rule (for example, when a plurality of data transfer requests are simultaneously issued), and sequentially outputs the data transfer requests one by one to the mask control circuit 13.

The mask control circuit 13 loads the plurality of data transfer requests output from the arbitration circuit 12, and sequentially outputs, to the memory controller 14, the plurality of loaded data transfer requests after the lapse of the mask period.

(A Specific Configuration Example of the Mask Control Circuit 13)

Figure 2:
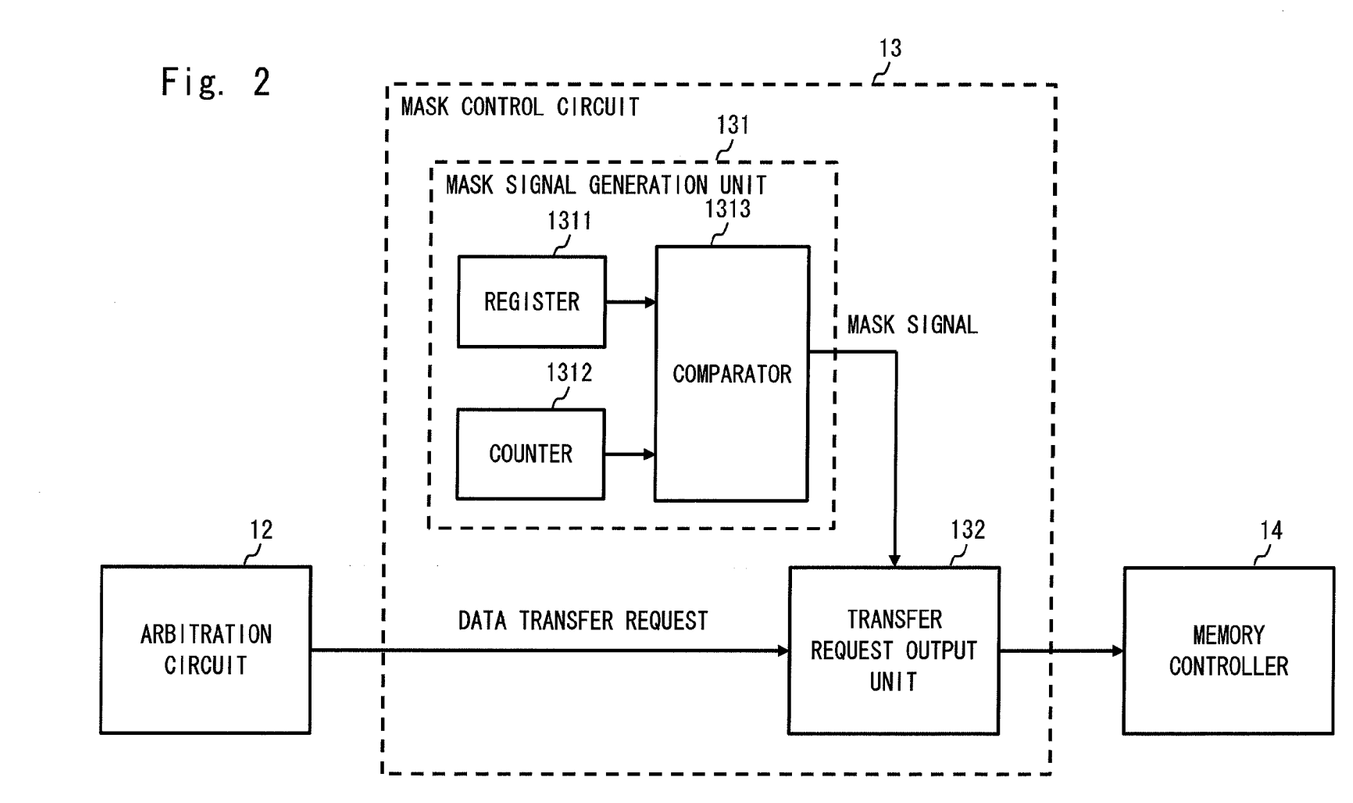
FIG. 2 is a block diagram showing a configuration example of a mask control circuit according to the first embodiment.

FIG. 2 is a block diagram showing a specific configuration example of the mask control circuit 13. The mask control circuit 13 shown in FIG. 2 includes a mask signal generation unit 131 and a transfer request output unit 132. The mask signal generation unit 131 includes a register 1311, a counter 1312, and a comparator 1313.

The mask signal generation unit 131 generates a mask signal that is periodically switched between an active state and an inactive state. In the mask signal generation unit 131, the counter 1312 increases the count value by "1" in synchronization with a clock signal. When the count value reaches a maximum value MAX, the counter 1312 resets the count value to "0". The register 1311 stores a predetermined threshold Nt. The comparator 1313 compares the count value of the counter 1312 with the threshold Nt. Specifically, when the count value of the counter 1312 is equal to or less than the threshold Nt, the comparator 1313 sets the mask signal to the active state (for example, H level), and when the count value of the counter 1312 is larger than the threshold Nt, the comparator 1313 sets the mask signal to the inactive state (for example, L level). A period in which the mask signal is in the active state is referred to as a mask period, and a period in which the mask signal is in the inactive state is referred to as a mask release period.

The transfer request output unit 132 loads the plurality of data transfer requests, which are sequentially output from the arbitration circuit 12, and sequentially outputs the plurality of loaded data transfer requests when the mask signal is in the inactive state (during the mask release period). The transfer request output unit 132 includes at least a configuration (so-called FIFO) that first outputs a data transfer request that is first input.

Returning to FIG. 1, the memory controller 14 accesses the DRAM 20 based on the data transfer requests sequentially output from the mask control circuit 13. For example, the memory controller 14 reads out data stored in a memory cell at a designated address in the DRAM 20, or writes data into a memory cell at a designated address in the DRAM 20, based on the data transfer requests. The memory controller 14 outputs data read from the DRAM 20, or information on data write completion notification indicating completion of data write to the DRAM 20, to the processing blocks which have issued the data transfer requests, via the bus 11.

When a subsequent data transfer request is not present (not received) for a predetermined period after completion of access to the DRAM 20 based on a certain data transfer request, the memory controller 14 causes the mode of the DRAM 20 to be switched from a normal operation mode to a power saving mode, and maintains the power saving mode until the subsequent data transfer request is received.

The term "power saving mode" of the DRAM 20 refers to a so-called self-refresh mode. In the self-refresh mode, the DRAM 20 repeatedly executes a refresh operation autonomously by a timer which is incorporated therein or connected thereto. At this time, the DRAM 20 is only supplied with power, while it is not supplied with any clock signal. This results in a reduction in power consumption of the DRAM 20.

(Operation of the Processor System 1 According to the First Embodiment)

Figure 3:
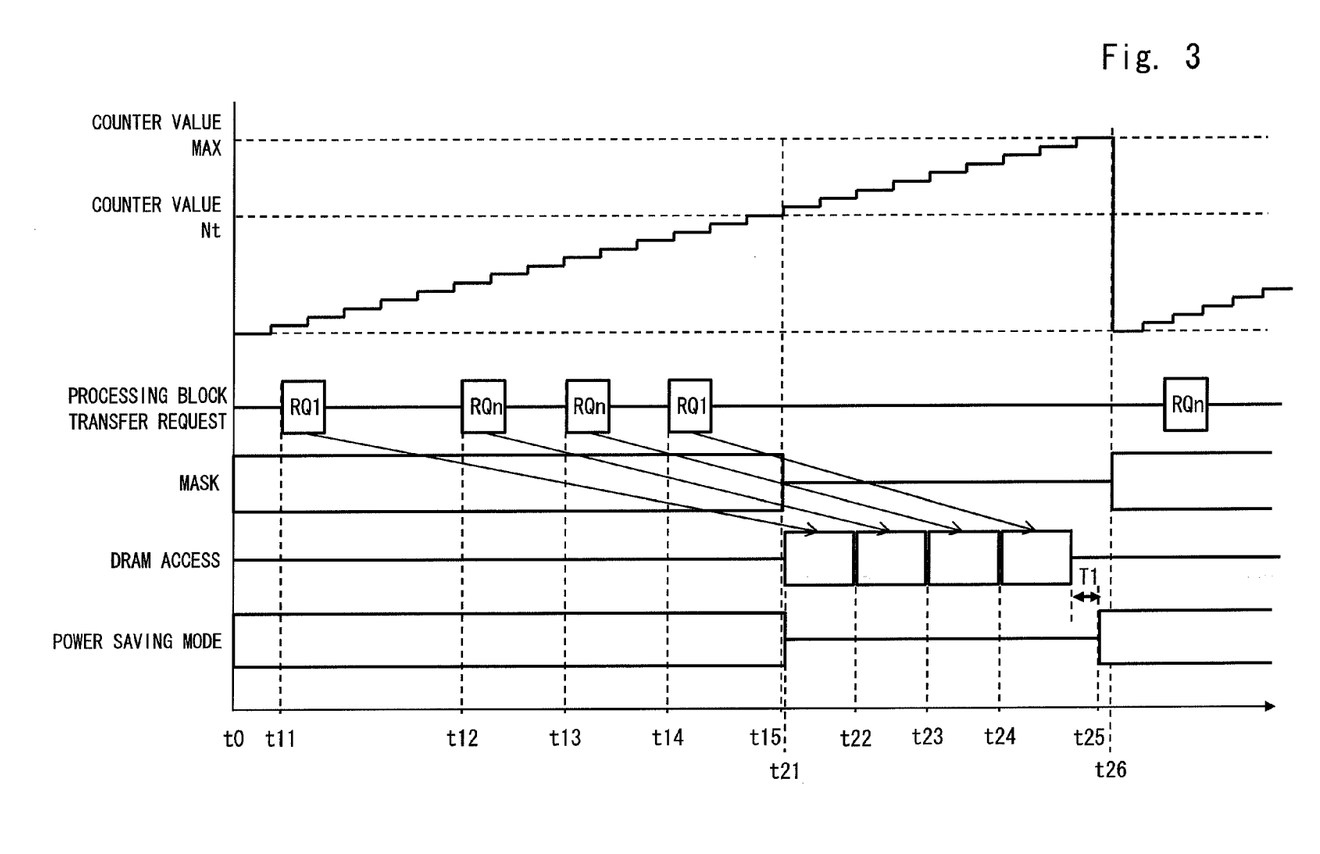
FIG. 3 is a timing diagram showing an operation of a processor system according to the first embodiment.

Referring next to FIG. 3, an operation of the processor system 1 according to the first embodiment will be described. FIG. 3 is a timing diagram showing an operation of the processor system 1 according to the first embodiment.

In an initial state (time t0), the counter 1312 starts a count-up operation from the count value "0" which is the initial value. At the same time, the mask signal becomes active, and the mode of the DRAM 20 is set to the power saving mode.

First, the processing block B1 issues the first data transfer request RQ1 (time t11). After that, the processing block Bn sequentially issues the first data transfer request RQn and the second data transfer request RQn, and then the processing block B1 issues the second data transfer request RQ1 (times t12, t13, t14). During this period, the count value of the counter 1312 is equal to or less than the threshold Nt, so the mask signal is maintained in the active state. Accordingly, the mask control circuit 13 does not output the data transfer request to the memory controller 14 (from time t11 to time t15). Thus, the memory controller 14 maintains the power saving mode of the DRAM 20 without causing the mode to be switched to the normal operation mode (from time t11 to time t21).

After that, when the count value of the counter 1312 is larger than the threshold Nt, the mask signal is switched from the active state to the inactive state (time t15). Accordingly, the mask control circuit 13 sequentially outputs the plurality of loaded data transfer requests (four data transfer requests in the example shown in FIG. 3) to the memory controller 14. The memory controller 14 accesses the DRAM 20 based on the plurality of data transfer requests sequentially output from the mask control circuit 13 (times t21, t22, t23, t24). Upon receiving the data transfer requests, the memory controller 14 causes the mode of the DRAM 20 to be switched from the power saving mode to the normal operation mode (time t21).

After that, when the count value of the counter 1312 reaches the maximum value MAX, the count value of the counter 1312 is reset to "0", so the mask signal is switched from the inactive state to the active state (time t26). Accordingly, the mask control circuit 13 stops the output of data transfer requests to the memory controller 14. Since the memory controller 14 has not received a subsequent data transfer request during the predetermined period T1 after the completion of the access to the DRAM 20, the memory controller 14 causes the mode of the DRAM 20 to be switched from the normal operation mode to the power saving mode (time t25). The operation described above is then repeated.

The threshold Nt and the maximum value MAX of the count value can be arbitrarily set. In other words, the length of each of the mask period and the mask release period, which are periodically switched, can be arbitrarily set. However, it is necessary to set the threshold Nt and the maximum value MAX of the count value so as to satisfy all the required performances of the plurality of processing blocks B1 to Bn, respectively. The term "required performance" of a certain processing block refers to a time period required from when a certain processing block issues a data transfer request until when the processing block receives data (or data write completion notification) read from the DRAM 20.

When the mask control circuit 13 cannot output all the loaded data transfer requests during the mask release period, the mask control circuit 13 outputs the remaining data transfer requests, which have not been output, during the subsequent mask release period.

In this manner, the processor system 1 according to the first embodiment (and the semiconductor device 10 provided therein) includes the control circuit 13 that sequentially outputs the plurality of data transfer requests, which are output from the arbitration circuit 12, to the memory controller 14 after the lapse of the mask period. This allows the processor system 1 according to the first embodiment (and the semiconductor device 10 provided therein) to effectively set the mode of the DRAM 20 to the power saving mode, thereby suppressing an increase in power consumption.

Second Embodiment

Next, a processor system 1*a* according to a second embodiment will be described. As compared with the processor system 1 according to the first embodiment, the processor system 1*a* according to the second embodiment includes a mask control circuit 13*a* in place of the mask control circuit 13. The other components of the processor system 1*a* are similar to those of the processor system 1, so the description thereof is omitted.

The mask control circuit 13*a* dynamically sets the mask period based on the total amount of data on the data transfer requests issued from the plurality of processing blocks B1 to Bn during the monitoring period. For example, when the total amount of data on the data transfer requests issued from the plurality of processing blocks B1 to Bn during the monitoring period is large, the mask control circuit 13*a* determines that access to the DRAM 20 is concentrated, and decreases the mask period. When the total amount of data on the data transfer requests issued from the plurality of processing blocks B1 to Bn during the monitoring period is small, the mask control circuit 13*a* determines that the DRAM 20 is less frequently accessed, and increases the mask period.

(A Specific Configuration Example of the Mask Control Circuit 13*a*)

Figure 4:
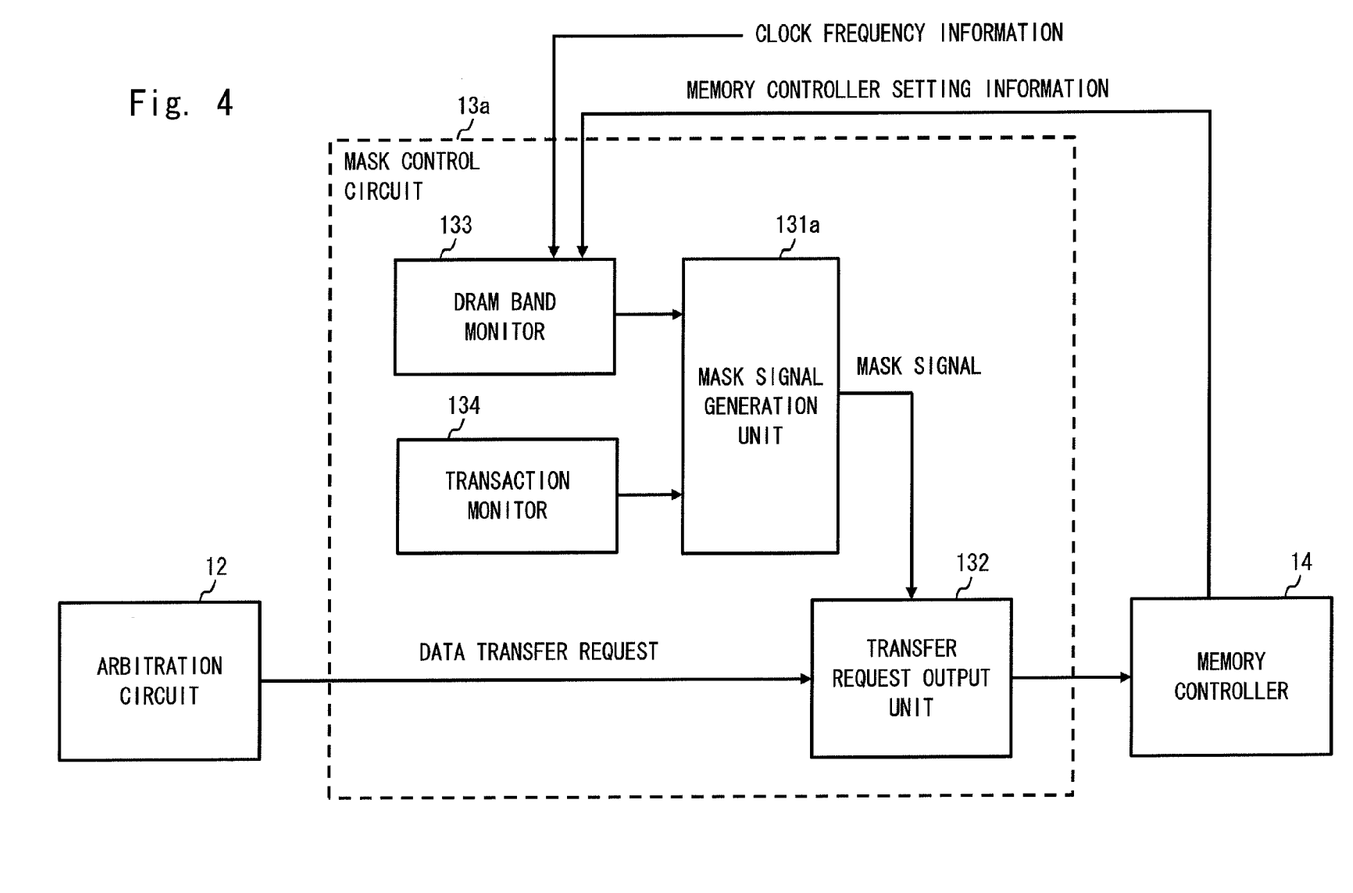
FIG. 4 is a block diagram showing a configuration example of a mask control circuit according to a second embodiment.

FIG. 4 is a block diagram showing a specific configuration of the mask control circuit 13*a*. The mask control circuit 13*a* shown in FIG. 4 includes a mask signal generation unit 131*a*, the transfer request output unit 132, a DRAM band monitor (first monitor) 133, and a transaction monitor (second monitor) 134.

The DRAM band monitor 133 calculates the total amount of data that can be accepted by the DRAM 20, based on clock frequency information, memory controller setting information, or the like.

The transaction monitor 134 measures the total amount of data (the number of bytes) on data transfer requests issued during a certain monitoring period.

The mask signal generation unit 131*a* calculates the remaining amount of data that can be accepted by the DRAM 20 during a certain monitoring period, based on a monitoring result of the DRAM band monitor 133 and a monitoring result of the transaction monitor 134. Further, the mask signal generation unit 131*a* sets, as a mask period in a subsequent monitoring period, a period corresponding to the remaining amount of data that can be accepted by the DRAM 20.

For example, when the remaining amount of data that can be accepted by the DRAM 20 during a certain monitoring period is small, the mask signal generation unit 131*a* determines that access to the DRAM 20 is concentrated, and decreases the mask period in the subsequent monitoring period. When the remaining amount of data that can be accepted by the DRAM 20 during a certain monitoring period is large, the mask signal generation unit 131*a* determines that the DRAM 20 is less frequently accessed, and increases the mask period in the subsequent monitoring period.

(Operation of the Processor System 1*a* According to the Second Embodiment)

Figure 5:
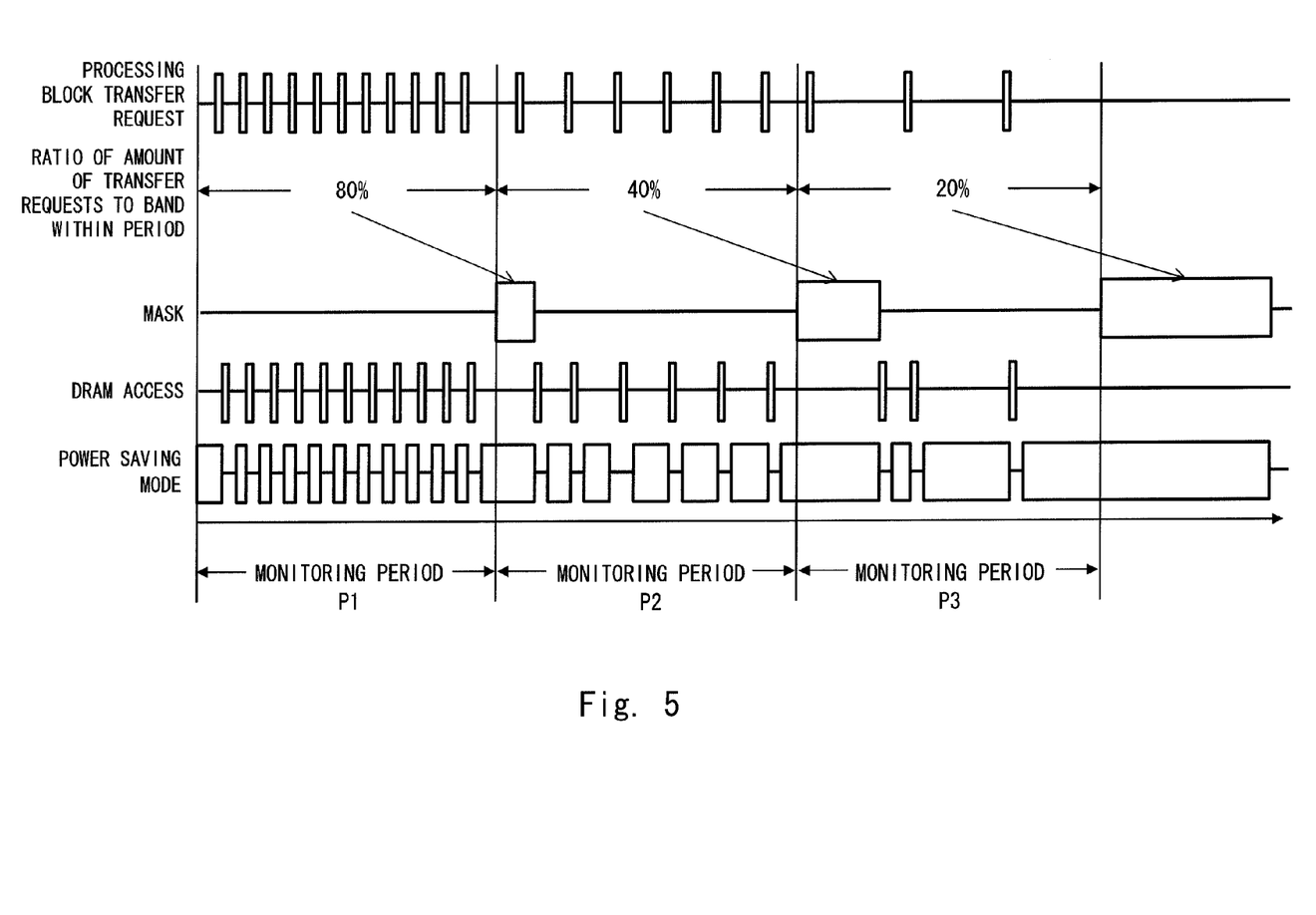
FIG. 5 is a timing diagram showing an operation of a processor system according to the second embodiment.

Referring next to FIG. 5, an operation of the processor system 1*a* according to the second embodiment will be described. FIG. 5 is a timing diagram showing an operation of the processor system 1*a* according to the second embodiment.

First, during a monitoring period P1, 11 data transfer requests are issued. In the example shown in FIG. 5, the total amount of data on the 11 data transfer requests corresponds to 80% of the total amount of data that can be accepted by the DRAM 20. In other words, the remaining amount of data that can be accepted by the DRAM 20 corresponds to 20% of the total amount of data. That is, the DRAM 20 is relatively frequently accessed during the monitoring period P1. Accordingly, a relatively short mask period is set in a subsequent monitoring period P2.

Next, in the monitoring period P2, six data transfer requests are issued. In the example shown in FIG. 5, the total amount of data on the six data transfer requests corresponds to 40% of the total amount of data that can be accepted by the DRAM 20. In other words, the remaining amount of data that can be accepted by the DRAM 20 corresponds to 60% of the total amount of data. That is, the DRAM 20 is less frequently accessed in the monitoring period P2 than in the monitoring period P1. Accordingly, a relatively long mask period is set in a subsequent monitoring period P3.

Next, in the monitoring period P3, three data transfer requests are issued. In the example shown in FIG. 5, the total amount of data on the three data transfer requests corresponds to 20% of the total amount of data that can be accepted by the DRAM 20. In other words, the remaining amount of data that can be accepted by the DRAM 20 corresponds to 80% of the total amount of data. That is, the DRAM 20 is much less frequently accessed in the monitoring period P3 than in the monitoring period P2. Accordingly, a much longer mask period is set in a subsequent monitoring period.

In this manner, the processor system 1*a* according to the second embodiment (and a semiconductor device provided therein) includes the mask control circuit 13*a* that dynamically sets the mask period based on the total amount of data on the data transfer requests issued from the plurality of processing blocks B1 to Bn during the monitoring period. This allows the processor system 1*a* according to the second embodiment (and the semiconductor device provided therein) to effectively set the mode of the DRAM 20 to the power saving mode, thereby further suppressing an increase in power consumption.

Though the second embodiment illustrates a case where a mask period in a subsequent monitoring period is set based on the total amount of data on the data transfer requests issued during a certain monitoring period, the present invention is not limited to this. The mask period in the subsequent monitoring period may be set based on an average value of the total amounts of data on data transfer requests issued in a plurality of monitoring periods.

Third Embodiment

Next, a processor system 1*b* according to third embodiment will be described. As compared with the processor system 1 according to the first embodiment, the processor system 1b according to the third embodiment includes a mask control circuit 13b in place of the mask control circuit 13. The processing blocks B1 to Bn output the data transfer requests RQ1 to RQn, respectively, and also output QoS (Quality of Service) information (hereinafter referred to as "priority information") PR1 to PRn, respectively, which indicate priorities of the data transfer requests. The other components of the processor system 1b are similar to those of the processor system 1, so the description thereof is omitted.

The mask control circuit 13b outputs, to the memory controller 14, each data transfer request output from the arbitration circuit 12, after a lapse of a mask period of a length that is set according to the priority of each data transfer request. For example, when the priority of a certain data transfer request is high, the mask control circuit 13b decreases the mask period, and when the priority of a certain data transfer request is low, the mask control circuit 13b increases the mask period.

(A Specific Configuration Example of a Mask Control Circuit 13b)

Figure 6:
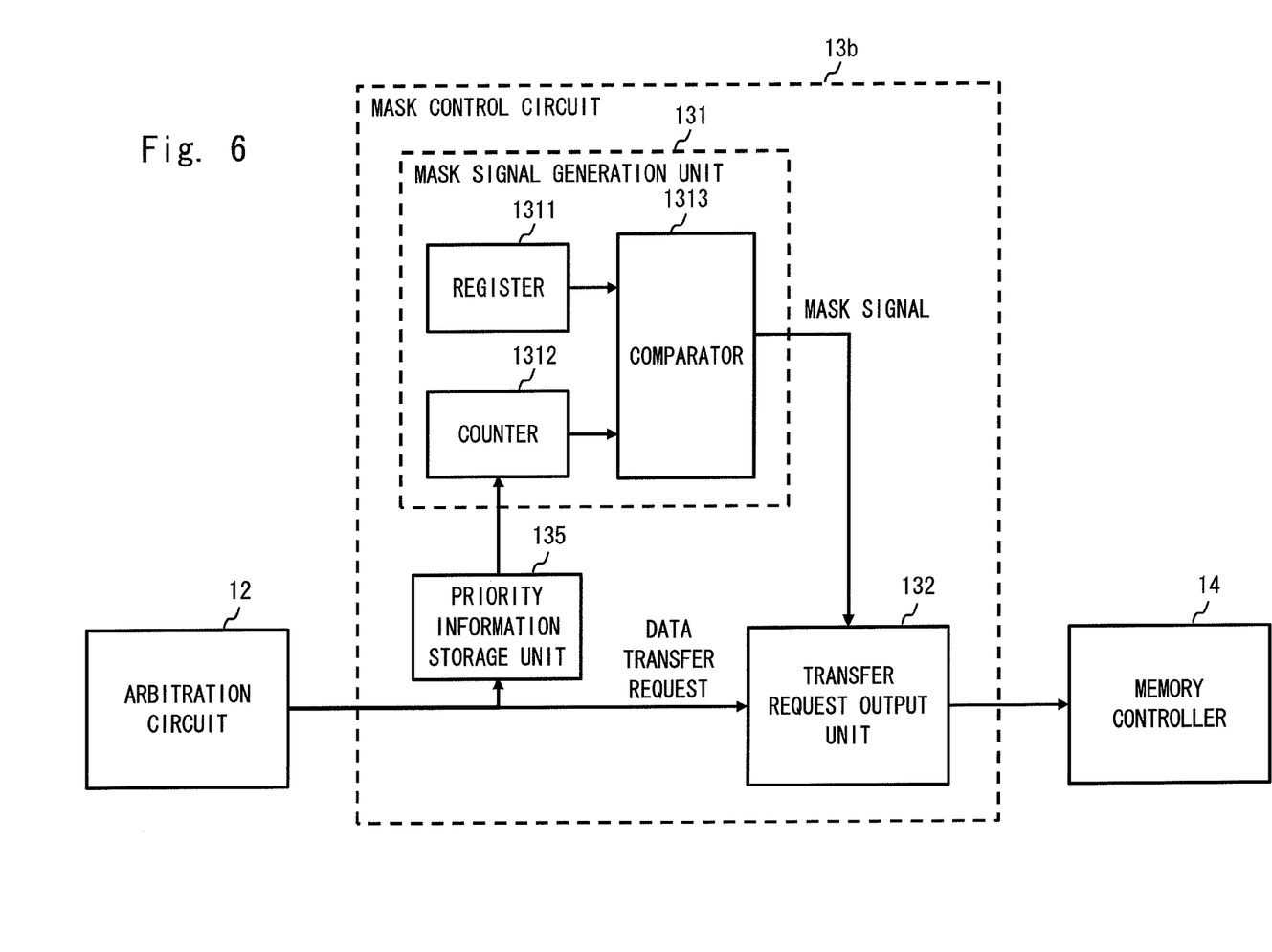
FIG. 6 is a block diagram showing a configuration example of a mask control circuit according to a third embodiment.

FIG. 6 is a block diagram showing a specific configuration example of the mask control circuit 13b. The mask control circuit 13b shown in FIG. 6 includes the mask signal generation unit 131, the transfer request output unit 132, and a priority information storage unit 135.

The priority information storage unit 135 stores the priority information corresponding to the data transfer requests output from the arbitration circuit 12. The priority information storage unit 135 includes at least a configuration (so-called FIFO) that first outputs a data transfer request that is first input.

The counter 1312 provided in the mask signal generation unit 131 starts a count-up operation from a count value set based on the priority information stored in the priority information storage unit 135.

For example, when the priority is high, the counter 1312 starts the count-up operation from a high count value, and when the priority is low, the counter 1312 starts the count-up operation from a low count value. Accordingly, when the priority is high, the active period (mask period) of the mask signal is short, and when the priority is low, the active period (mask period) of the mask signal is long.

(Operation of the Processor System 1b According to the Third Embodiment)

Figure 7:
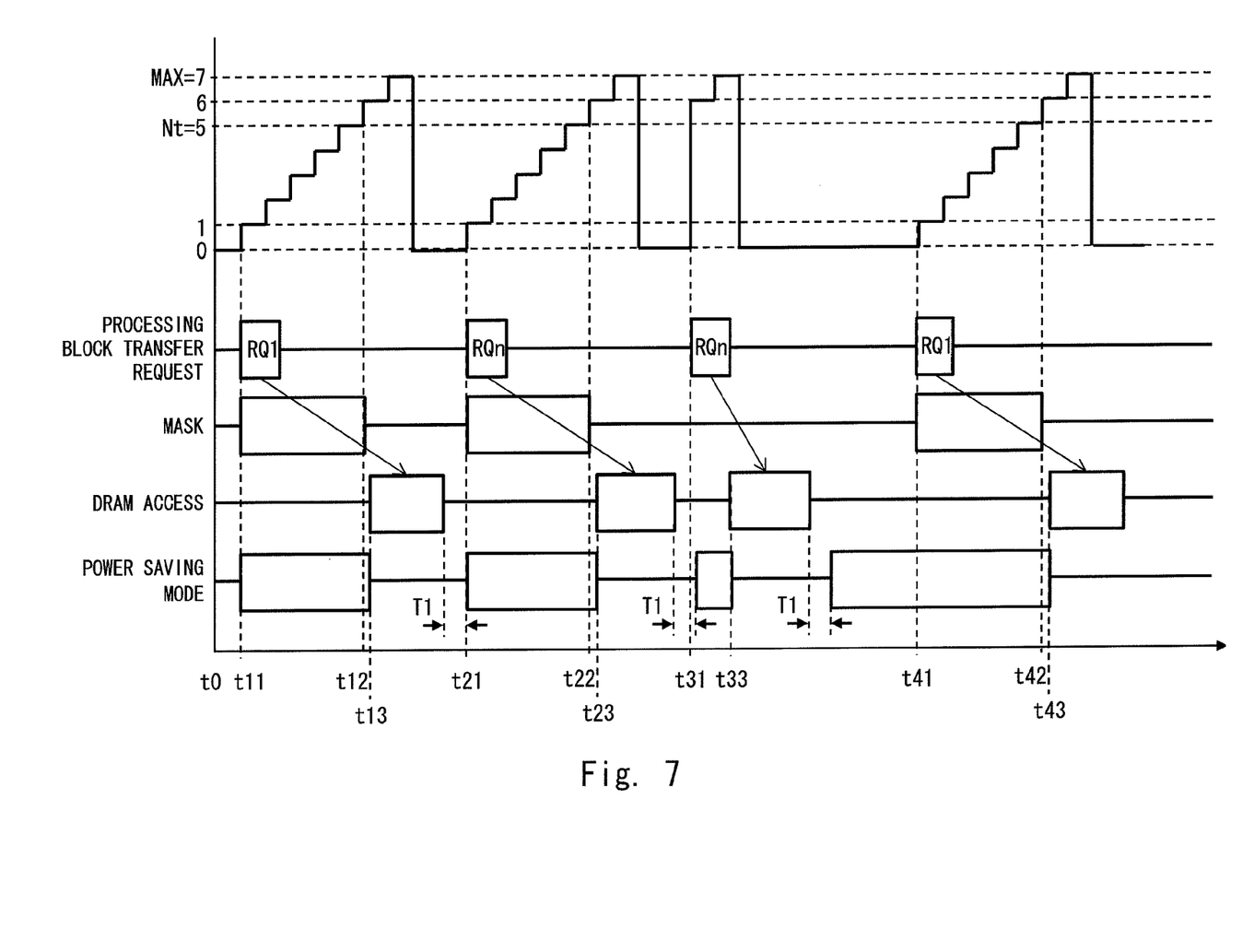
FIG. 7 is a timing diagram showing an operation of a processor system according to the third embodiment.

Referring next to FIG. 7, an operation of the processor system 1b according to the third embodiment will be described. FIG. 7 is a timing diagram showing an operation of the processor system 1b according to the third embodiment.

In an initial state (time t0), the count value of the counter 1312 is reset to "0", and the mode of the DRAM 20 is set to the power saving mode.

First, the processing block B1 issues the first data transfer request RQ1 and priority information on the first data transfer request RQ1 (time t11). In the example shown in FIG. 7, the priority of the data transfer request RQ1 is low, so the count value is set to "1". Accordingly, the counter 1312 starts the count-up operation from the count value "1" (time t11). At the same time, the mask signal becomes active. After that, the active state of the mask signal is maintained until the count value of the counter 1312 is larger than the threshold Nt (Nt=5 in this example) (from time t11 to time t12). Thus, the mask control circuit 13b does not output any data transfer request RQ to the memory controller 14 (from time t11 to time t12).

When the count value of the counter 1312 is larger than the threshold Nt, the mask signal is switched from the active state to the inactive state (time t12). Accordingly, the mask control circuit 13b outputs the loaded data transfer request RQ1 to the memory controller 14. The memory controller 14 accesses the DRAM 20 based on the data transfer request RQ1 output from the mask control circuit 13b (time t13). Upon receiving the data transfer request RQ1, the memory controller 14 causes the mode of the DRAM 20 to be switched from the power saving mode to the normal operation mode (time t13).

Next, the processing block Bn issues the first data transfer request RQn and priority information on the first data transfer request RQn (time t21). In the example shown in FIG. 7, the priority of the data transfer request RQn is low, so the count value is set to "1". After that, the operation proceeds in the same way as that during the period from time t11 to time t13 (from time t21 to time t23).

Next, the processing block Bn issues the second data transfer request RQn and priority information on the second data transfer request RQn (time t31). In the example shown in FIG. 7, the priority of the data transfer request RQn is high, so the count value is set to "6". In other words, the count value is set to be higher than the threshold Nt (=5). Therefore, the mask signal is not switched to the active state, but remains in the inactive state. As a result, the mask control circuit 13b rapidly outputs the loaded data transfer request RQ1 to the memory controller 14 without masking the data transfer request. The memory controller 14 accesses the DRAM 20 based on the data transfer request RQn output from the mask control circuit 13b (time t33).

Next, the processing block B1 issues the second data transfer request RQ1 and priority information on the second data transfer request RQ1 (time t41). In the example shown in FIG. 7, the priority of the data transfer request RQ1 is low, so the count value is set to "1". After that, the operation proceeds in the same way as that during the period from time t11 to time t13 (time t41 to t43).

In this manner, the processor system 1b according to the third embodiment (and a semiconductor device provided therein) includes the mask control circuit 13b that outputs, to the memory controller 14, each data transfer request output from the arbitration circuit 12, after a lapse of a mask period of a length that is set according to the priority of each data transfer request. This allows the processor system 1b according to the third embodiment (and the semiconductor device provided therein) to effectively set the mode of the DRAM 20 to the power saving mode, thereby suppressing an increase in power consumption.

As described above, the processor systems according to the first to third embodiments and semiconductor devices provided therein include the mask control circuit that compresses a plurality of data transfer requests sequentially output from the arbitration circuit, and sequentially outputs the data transfer requests to the memory controller after a lapse of a mask period. This allows the processor systems according to the embodiments to effectively set the mode of the memory to the power saving mode, thereby suppressing an increase in power consumption.

(Differences Between the Present Invention and Related Art)

The configuration of the mask control circuit is not disclosed in any of Japanese Unexamined Patent Application Publication Nos. 2012-133638, 2004-120781, 2007-257774, and 2007-94649. Therefore, it is difficult for the configurations disclosed in this related art to sufficiently suppress an increase in power consumption. On the other hand, such a problem does not occur in the processor systems according to the embodiments described above and semiconductor devices provided therein.

In the configuration disclosed in Japanese Unexamined Patent Application Publication No. 2004-120781, the memory circuit outputs the control signal WAIT to the control circuit during a read transfer or a write transfer, thereby limiting access from the control circuit, but is not intended to suppress an increase in power consumption. Additionally, the mode of the memory circuit is not switched to the power saving mode.

The configuration disclosed in Japanese Unexamined Patent Application Publication No. 2007-257774 adjusts a timing for refreshing a DRAM according to the degree of congestion of a bus used for a data transfer with the DRAM, but is not intended to suppress an increase in power consumption. Additionally, the mode of the DRAM is not switched to the power saving mode.

The configuration disclosed in Japanese Unexamined Patent Application Publication No. 2007-94649 dynamically changes the order of priority of previously stored access requests based on the order of priority of newly stored access requests. Additionally, the mode of the memory is not switched to the power saving mode.

The invention made by the present inventors has been described in detail above in reference to embodiments, but the present invention is not limited to the embodiments described above. The present invention can be modified in various manners without departing from the scope of the present invention.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
a plurality of processing circuits;
an arbitration circuit that arbitrates a plurality of data transfer requests issued by the plurality of processing circuits;
a mask control circuit that loads the plurality of data transfer requests arbitrated by the arbitration circuit, and sequentially outputs the plurality of data transfer requests after a lapse of a mask period; and
a memory controller that accesses a memory based on the plurality of data transfer requests sequentially output from the mask control circuit, and switches a mode of the memory to a power saving mode when no data transfer request is output from the mask control circuit for a predetermined period,
wherein the mask control circuit comprises
a mask signal generation circuit that generates a mask signal, the mask signal being periodically switched between an active state and an inactive state; and
a transfer request output circuit coupled to the arbitration circuit which receives the mask signal that sequentially outputs the plurality of loaded data transfer requests to the memory controller when the mask signal is in the inactive state.

2. The semiconductor device according to claim 1, wherein the mask signal generation unit comprises:
a register that stores a predetermined threshold;
a counter; and
a comparator that compares a count value of the counter with a threshold of the register, and outputs a comparison result as the mask signal.

3. The semiconductor device according to claim 1, wherein each of the processing circuits issues a data transfer request, and issues priority information indicating a priority of the data transfer request, and
the mask control circuit outputs the loaded data transfer request after a lapse of a mask period of a length set according to the priority of the data transfer request.

4. The semiconductor device according to claim 1, wherein the memory is a DRAM.

5. A processor system comprising:
the semiconductor device set forth in claim 1; and
the memory.

6. The semiconductor device according to claim 1, wherein said power saving mode comprises supplying power and not supplying a clock signal to the memory.

7. A semiconductor device comprising:
a plurality of processing circuits;
an arbitration circuit that arbitrates a plurality of data transfer requests issued by the plurality of processing circuits;
a mask control circuit that loads the plurality of data transfer requests arbitrated by the arbitration circuit, and sequentially outputs the plurality of data transfer requests after a lapse of a mask period; and
a memory controller that accesses a memory based on the plurality of data transfer requests sequentially output from the mask control circuit, and switches a mode of the memory to a power saving mode when no data transfer request is output from the mask control circuit for a predetermined period,
wherein the mask control circuit comprises
a first monitor that monitors a total amount of data on data transfer requests issued by the plurality of processing circuits during a monitoring period;
a second monitor that monitors a total amount of data that can be accepted by the memory;
a mask signal generation unit that generates a mask signal, the mask signal being periodically switched between an active state and an inactive state; and
a transfer request output unit that sequentially outputs the plurality of loaded data transfer requests when the mask signal is in the inactive state, and
wherein the mask signal generation unit sets a length of an active period of the mask signal as the mask period, based on monitoring results of the first and second monitors.

8. The semiconductor device according to claim 7, wherein the mask signal generation unit sets a length of an active period of the mask signal in a subsequent monitoring period, based on monitoring results of the first and second monitors in a certain monitoring period.

9. The semiconductor device according to claim 8,
wherein the mask signal generation unit decreases the active period of the mask signal in the subsequent monitoring period when a remaining amount of data that can be accepted by the memory during a certain monitoring period is small, and the mask signal generation unit increases the active period of the mask signal in the subsequent monitoring period when a remaining amount of data that can be accepted by the memory during a certain monitoring period is large.

10. The semiconductor device according to claim 7, wherein said power saving mode comprises supplying power and not supplying a clock signal to the memory.

11. A semiconductor device comprises:
a plurality of processing circuits;
an arbitration circuit that arbitrates a plurality of data transfer requests issued by the plurality of processing circuits;
a mask control circuit that loads the plurality of data transfer requests arbitrated by the arbitration circuit, and sequentially outputs the plurality of data transfer requests after a lapse of a mask period; and
a memory controller that accesses a memory based on the plurality of data transfer requests sequentially output from the mask control circuit, and switches a mode of the memory to a power saving mode when no data transfer request is output from the mask control circuit for a predetermined period,
wherein each of the processing circuits issues a data transfer request, and issues priority information indicating a priority of the data transfer request,
wherein the mask control circuit outputs the loaded data transfer request after a lapse of a mask period of a length set according to the priority of the data transfer request,
wherein the mask control circuit comprises
a mask signal generation unit that generates a mask signal, the mask signal being periodically switched between an active state and an inactive state;
a transfer request output unit that outputs the loaded data transfer request when the mask signal is in the inactive state; and
a priority information storage unit that stores the priority information, and
wherein the mask signal generation unit sets a length of an active period of the mask signal as the mask period, based on the priority information stored in the priority information storage unit.

12. The semiconductor device according to claim 11, wherein
the mask signal generation unit comprises:
a register that stores a predetermined threshold;
a counter; and
a comparator that compares a count value of the counter with a threshold of the register, and outputs a comparison result as the mask signal, and
the counter performs a count-up operation from a count value set based on the priority information stored in the priority information storage unit.

13. The semiconductor device according to claim 11, wherein said power saving mode comprises supplying power and not supplying a clock signal to the memory.

* * * * *